(12) United States Patent
Amini et al.

(10) Patent No.: US 8,433,669 B2
(45) Date of Patent: Apr. 30, 2013

(54) CONFIGURING INDIVIDUAL CLASSIFIERS WITH MULTIPLE OPERATING POINTS FOR CASCADED CLASSIFIER TOPOLOGIES UNDER RESOURCE CONSTRAINTS

(75) Inventors: Lisa Amini, Yorktown Heights, NY (US); Brian K. Foo, Los Angeles, CA (US); Deepak S. Turaga, Nanuet, NY (US); Olivier Verscheure, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1145 days.

(21) Appl. No.: 11/939,849

(22) Filed: Nov. 14, 2007

(65) Prior Publication Data

US 2009/0125473 A1     May 14, 2009

(51) Int. Cl.
   *G06N 5/02* (2006.01)
(52) U.S. Cl.
   USPC ............................................. 706/50
(58) Field of Classification Search .......... 706/50, 706/12, 20
   See application file for complete search history.

(56) References Cited

U.S. PATENT DOCUMENTS

| | | | | |
|---|---|---|---|---|
| 7,769,228 B2* | 8/2010 | Bahlmann et al. | ............ | 382/155 |
| 2005/0189415 A1* | 9/2005 | Fano et al. | .................... | 235/383 |
| 2006/0112038 A1 | 5/2006 | Luo | | |
| 2006/0177099 A1* | 8/2006 | Zhu et al. | ...................... | 382/104 |
| 2007/0112701 A1* | 5/2007 | Chellapilla et al. | ............ | 706/15 |

OTHER PUBLICATIONS

Y. Chi, Philip S. Yu, Haixun Wang, Richard R. Muntz, "Loadstar: A Load Shedding Scheme for Classifying Data Streams," IEEE ICDM, 2004.

Huitao Luo, "Optimization Design of Cascaded Classifiers", Proceedings of the 2005 IEEE Computer Society Conference on Computer Vision and Pattern Recognition (CVPR'05).

Paul Viola, Michael Jones, "Rapid Objection Detection using a Boosted Cascade of Simple Features", IEEE, CVPR, 2001.

Fangwen Fu, Deepak S. Turaga, Olivier Verscheure, Mihaela van der Schaar, Lisa Amini, "Configuring Competing Classifier Chains in Distributed Stream Mining Systems", submitted to IEEE JSTSP.

Brian Babcock, Shivnath Babu, Mayur Datar, Rajeev Motwani, "Chain: Operator Scheduling for Memory Minimization in Data Stream Systems", ACM SIGMOD, 2003, Jun. 9-12, 2003, San Diego, CA.

Nesime Tatbul, Ugur Cetintemel, Stan Zdonik, Mitch Cherniack, Michael Stonebraker, "Load Shedding in a Data Stream Manager," Proceedings of the 29th VLDB Conference, Berlin, Germany, 2003.

Chris Olston, Jing Jiang, Jennifer Widom, "Adaptive Filters for Continuous Queries over Distributed Data Streams", ACM SIGMOD 2003, pp. 563-574, Jun. 2003.

(Continued)

*Primary Examiner* — Kakali Chaki
*Assistant Examiner* — Mai T Tran
(74) *Attorney, Agent, or Firm* — F. Chau & Associates, LLC; William J. Stock, Esq.

(57) ABSTRACT

A computer-implemented method for configuring a classifier structure includes receiving a classifier structure for identifying a feature of input data, adding a plurality of operating points to a parent binary classifier of the classifier structure, and setting the operating points to minimize a total cost based on resources available to the classifier structure. Each operating point controls how data is classified by the parent binary classifier for distribution to the child binary classifiers.

17 Claims, 6 Drawing Sheets

OTHER PUBLICATIONS

Jean Duong, Hubert Emptoz, "Cascade Classifier: Design and Application to Digit Recognition", Proceedings fo the 2005 8th International Conference on Document Analysis and Recognition (ICDAR '05).

Lorenzo Bruzzone, Robert Cossu, "A Multiple-Cascade-Classifier System for a Robust and Partially Unsupervised Updating of Land-Cover Maps", IEEE Transactions on Geoscience and Remote Sensing, vol. 40, No. 9, Sep. 2002.

Ankur Jain, Edward Y. Chang, Yuan-Fang Wang, "Adaptive Stream Resource Management Using Kalman Filters", SIGMOD 2004, Jun. 13-18, 2004, Paris, France.

Paul T. Boggs, Jon W. Tolle, "Sequential Quadratic Programming", Acta Nummerica (1996), pp. 1-52.

* cited by examiner

510
Identify resource constraints R on all processing nodes given node configurations
Determine cost coefficients for each class $k = 1, ..., K$ from application requirements.
Determine resource consumption per unit rate $h(l)$ for each individual classifier
Determine the matrix A given the placement of classifiers across nodes
Initialize by choosing a point in the set.
Set termination threshold and maximum number of iterations $J$.
for $j = 0$ to $J$     Calculate $g_i$ and $t_i$ for all edges/classes using recursive equations (1) and (2).
    Calculate resource usage based on input rates $t_i$. Calculate cost using equation (3).
    = SQPUpdate
    If, break.
end for
Return.

function SQPUpdate
    Update positive definite Hessian approximation $F_{new}$ (e.g., using BFGS) from equation (5).
    Solve using equation (6) and obtain search direction v.
    Calculate step size using a rule to decrease the merit function (e.g., Armijo rule).
    Update configuration.
    Return
end function

CONFIGURING INDIVIDUAL CLASSIFIERS WITH MULTIPLE OPERATING POINTS FOR CASCADED CLASSIFIER TOPOLOGIES UNDER RESOURCE CONSTRAINTS

ACKNOWLEDGMENT

This invention was made with United States Government support under Contract No. H98230-07-C-0383, awarded by Intelligence Agencies. The United States Government has certain rights in this invention.

BACKGROUND OF THE INVENTION

1. Technical Field

The present disclosure relates generally to optimizing the performance of cascaded based topologies, and more specifically to a method for optimizing the performance of cascaded based topologies using multiple operating points.

2. Discussion of Related Art

Classifiers label data objects by grouping them into one or more classes based on certain measured features. When the properties of a data object have a hierarchical structure, rather than making use of a single complex M-ary classifier, it can be more efficient to construct a cascade of low complexity binary classifiers. For example, the cascade may be more efficient when operating on continuous data streams. A binary classifier classifies a data object as belonging to one of two particular groups, based on whether or not the data object has a particular property or feature of that group. By using a cascade of classifiers, data of disinterest can be filtered out or discarded in an early stage of a classification process, thereby decreasing a processing load on downstream classifiers to lead to an overall reduction in resource consumption.

Conventional stream and data mining applications use cascades of classifiers to improve the confidence of an end to end classification. The applications are quite diverse, ranging from face recognition and rapid object detection in video scenes, analysis of land cover maps for crop detection, extraction of concepts from image data, digital recognition, etc. The resources that are available to an application making use of such a cascade can vary considerably. Prior research on resource constrained stream mining applications falls into two broad categories.

A first set of approaches rely on load-shedding, where applications determine a discard policy given the observed data characteristics (e.g., data is received in bursts), and the desired Quality of Service (QoS) requirements. Several of these approaches are limited by their assumption that the impact of load shedding on performance is a known a-priori. Further, such approaches often only consider simple data management jobs such as aggregation, for which the quality of the job result depends only on the sample size. Other load shedding approaches attempt to maximize certain Quality of Decision (QoD) measures based on a predicted distribution of feature values in future time units.

A second set of approaches formulate resource management in terms of a filtering problem and the designed solutions filter out unrelated data as early as possible, to conserve resources. Such approaches may have a simpler design and may be flexibly implemented. However, they often consider only locally available information and metrics, such as data characteristics, accuracy, or a QoD metric at a particular point in the system. This may lead to sub-optimal end-to-end performance when the data discarded at one stage is essential for a downstream (later stage) classifier.

Further, the classifiers of both approaches make use of a single operating point, thereby coupling the data rates of each outgoing "yes" and "no" edge. A "yes" edge indicates that the classifier has positively identified a particular feature within data, while a "no" edge indicates that the classifier has determined that the particular feature is not present within the data. A single operating point may not be able to partition data to satisfy resource constraints, especially when the resource constraints are tight or if the load is heavy, due to the rate coupling.

Thus, there is a need for methods of configuring binary classifiers under resource constraints to have multiple operating points.

SUMMARY OF THE INVENTION

According to an exemplary embodiment of the present invention, a computer-implemented method for configuring a classifier structure includes receiving a classifier structure for identifying a feature of input data, adding a plurality of operating points to a parent binary classifier of the classifier structure, and setting the operating points to minimize a total cost based on resources available to child binary classifiers of the classifier structure. The number of operating points may correspond to at most the number of child binary classifiers. Each operating point controls how data is classified by the parent binary classifier for distribution to the child binary classifiers. Each operating point corresponds to a cost associated with the classification of the parent binary classifier.

According to an exemplary embodiment of the present invention, a computer-implemented method for configuring a tree of binary classifiers includes receiving a tree of binary classifiers as input and configuring the tree so that each classifier has a plurality of operating points. Each tree-node of the tree represents a different one of the binary classifiers. Each classifier is assigned to one of a plurality of processing-nodes and is for detecting a feature. Each operating point is associated with the identification of the corresponding feature. Each of the operating points has a respective cost and each of the operating points are set to minimize a sum of the respective costs based on available resources of the processing-nodes.

According to an exemplary embodiment of the present invention, a computer-implemented method for configuring a cascade of binary classifiers includes receiving a cascade of binary classifiers as input and configuring the cascade so that each classifier has a plurality of operating points. Each binary classifier identifies a plurality of data features. Each of the classifiers is in sequence in the cascade. Each operating point is associated with the identification of the corresponding features. Each of the operating points has a respective cost and is set to minimize a sum of the respective costs based on available resources to the classifier cascade.

According to an exemplary embodiment of the present invention, a computer readable medium embodying instructions executable by a processor to perform method steps for configuring a classifier structure includes instructions for receiving a classifier structure for identifying a feature of input data, adding a plurality of operating points to a parent binary classifier of the classifier structure, assigning child binary classifiers of the classifier structure to one of a plurality of processing nodes, and setting the operating points to minimize a total cost based on resources provided to the classifier structure by respective processing nodes. The number of operating points may correspond to at most the number of child binary classifiers. Each operating point controls how data is classified by the parent binary classifier for distribution to the child binary classifiers. Each operating point corresponds to a cost associated with the classification of the parent binary classifier.

BRIEF DESCRIPTION OF THE DRAWINGS

Exemplary embodiments of the invention can be understood in more detail from the following descriptions taken in conjunction with the accompanying drawings in which.

DETAILED DESCRIPTION OF EXEMPLARY EMBODIMENTS

In general, exemplary embodiments methods for configuring binary classifiers under resource constraints to have multiple operating points will now be discussed in further detail with reference to illustrative embodiments of FIGS. 1-9.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
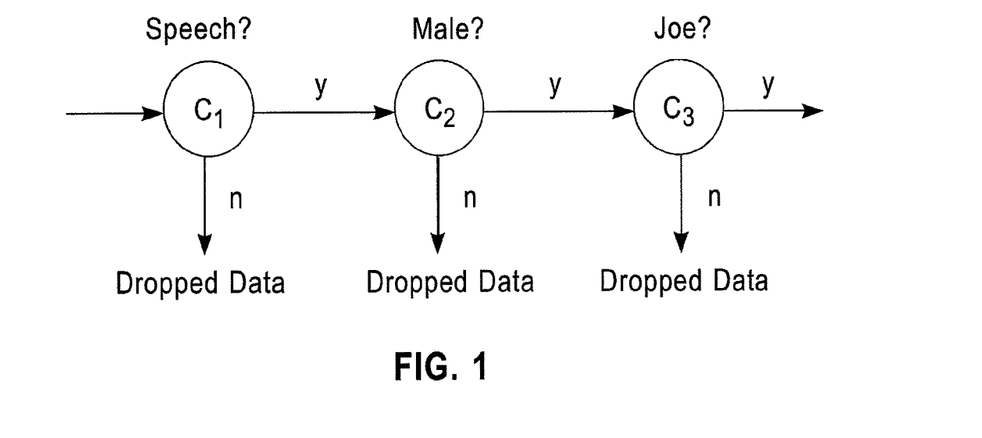
FIG. 1 illustrates an example of a cascade of classifiers.

FIG. 1 illustrates an example of a cascade of classifiers, which can be traversed by an application to identify whether speech samples belong to a particular speaker of interest "Joe". The application receives a data set of the speech samples and begins by first filtering out all non-speech samples using a binary speech detection classifier $C_1$, then continues by filtering out all female samples using a male gender detection classifier $C_2$, and finally, finishes by verifying the now reduced data set against a speaker-trained classifier $C_3$ that is trained against the particular speaker of interest "Joe". Since the speaker-trained classifier $C_3$ is generally complex, it is more efficient for the speaker-trained classifier $C_3$ to operate on such a reduced dataset. Further, operating on a reduced data, improves the confidence of the detections of the speaker-trained classifier $C_3$.

A classifier can make two different types of errors: missed detections and false alarms. In a missed detection, a classifier erroneously filters out or discards data that included a feature the classifier was trained to detect. In a false alarm, a classifier erroneously identifies data as having a feature the data does not actually contain.

Missed detections and false alarms can result in misclassified information, resulting in varying costs. For example, in the detection of credit card fraud, a large monetary penalty can be paid for the missed detection of a fraudulent transaction. Such a cost may be denoted the cost of a miss, $c_M^k$, which is the price paid when an item belonging to a set k is classified as belonging to another set (e.g., either of interest or disinterest).

When an action is taken as a result of a falsely detected phenomenon (e.g., forest fire, intruder alert), there is a cost associated with the extra resources spent on the wasted action. Such a cost may denoted by the cost of a false alarm, $c_F^k$, which corresponds to the price paid when an item belonging to another set is classified as set k.

The performance of an individual classifier may be measured as a tradeoff between the probability of a miss (equivalently the complimentary probability of detection), and the probability of false alarm. A detection-error tradeoff (DET) curve is a typical characterization of classifier performance that plots the probability of detection against the probability of false alarm.

Figure 2:
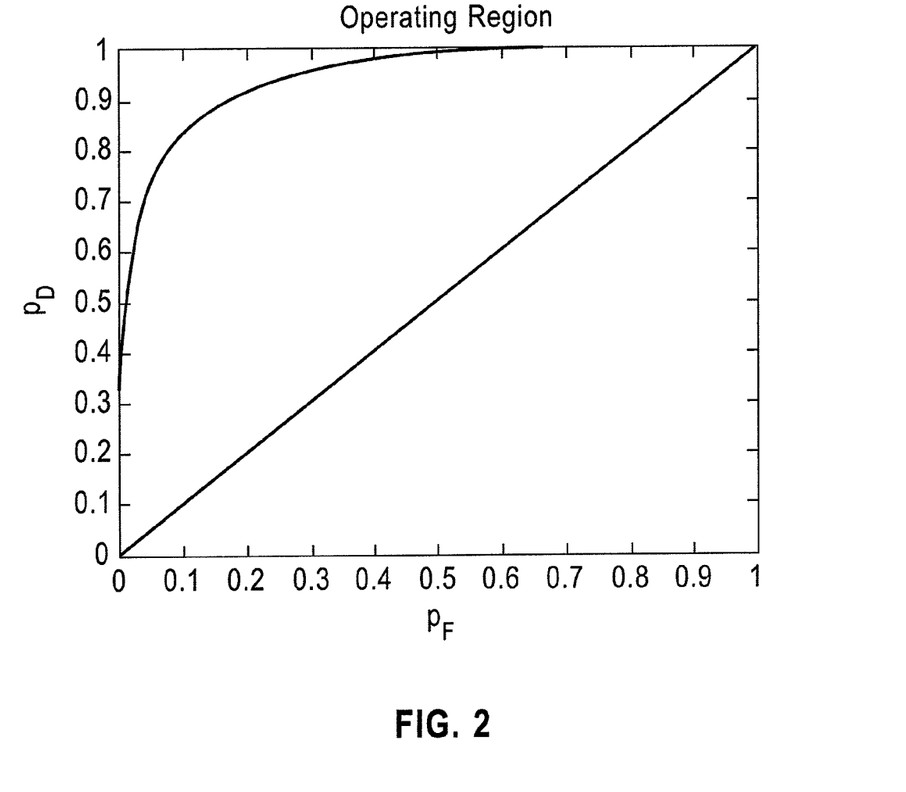
FIG. 2 illustrates an example of a DET curve and a lower bound line for classifier performance.

FIG. 2 illustrates an example of a DET curve and a lower bound line for classifier performance. The lower bound line corresponds to the labeling of data objects at random without processing any of their features. Different operating points for a classifier $C_i$, correspond to different probabilities of false detection $p_F^i$ and different probabilities of correct detection $p_D^i$.

Figure 3:
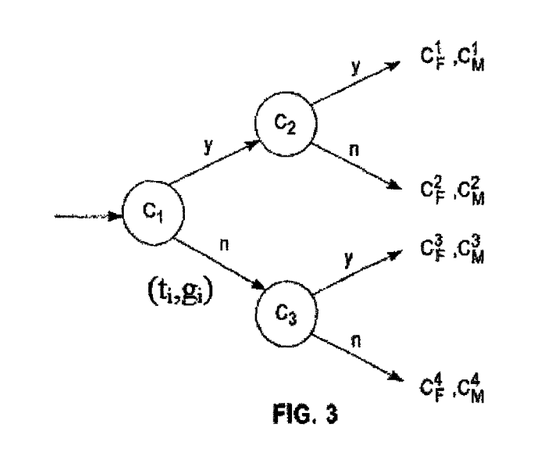
FIG. 3 illustrates an example of a cascade topology with separate costs for each classification.

FIG. 3 illustrates an example of a cascade topology with separate costs for each classification path. Classifier $C_i$ produces a throughput $t_i$ and a goodput $g_i$ along an edge that is transmitted to classifier $C_j$. The throughput corresponds to the total data transmitted along the edge, while the goodput corresponds to that part of the throughput that is correctly classified. Provided that the conditional a priori probability $\Phi_i^j$ that correctly classified data from classifier $C_i$ has the feature to be detected by classifier $C_j$, the throughput $t_j$ and goodput $g_j$ for the corresponding output edge of the classifier (per unit rate of data input) can be given by the following two equations, $$g_j = \Phi_i^j g_i p_D^j, \quad (1)$$

$$t_j = t_i p_F^j + \Phi_i^j g_i (p_D^j - p_F^j). \quad (2)$$

Given the a priori fraction or ground truth of data belonging to different classification paths, the total cost incurred by the cascade due to misclassification may be computed using the following equation 3

$$c = \sum_{k=1}^{K} [c_F^k(t^k - g^k) + c_M^k(\pi^k - g^k)], \quad (3)$$

where $t^k$ indicates the throughput or rate of data objects that are grouped into class k, $g^k$ indicates the goodput, or the rate of correctly classified data objects in class k, and $\pi^k$ indicates the a priori fraction of data belonging to class k.

Typical classifiers use one operating point to partition the input data into "yes" or "no" edges. The data received by a particular classifier along a single operating point can be quite large and require many resources to process.

Rather than using a single operating point for a classifier $C_i$, an exemplary embodiment of the present invention uses a separate and independent operating points for each outgoing "yes" and/or "no" edge. An operating point corresponds to a point on the DET curve having a particular probability of false detection $p_F$ and correct detection $p_D$.

Figure 4:
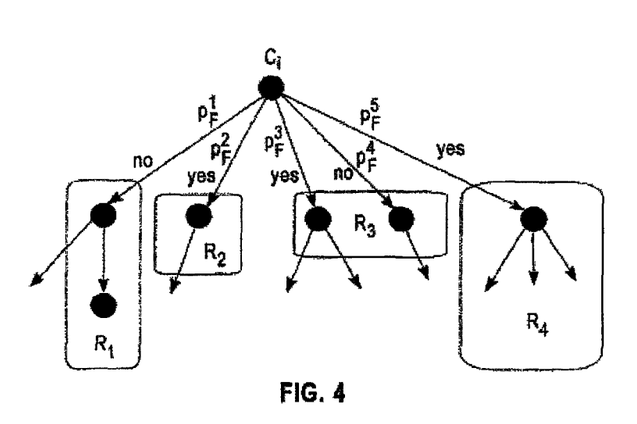
FIG. 4 illustrates a classifier with multiple operating points according to an exemplary embodiment of the present invention.

As shown in FIG. 4, data objects can be intelligently replicated or dropped based on the resource constraints of multiple classifiers that are being fed by the classifier $C_i$. Since the classifier $C_i$ operation is constrained to lie on the DET curve, the operating point for each classifier edge is uniquely determined by the false alarm configuration (i.e., the relationship between the probability of correct detection $p_D$ and false detection $p_F$).

The number of independent operating points for an individual classifier corresponds to at most the number of its outgoing edges. The specific operating points are selected based on the resource constraints of downstream classifiers. This is in contrast with current logical binary hierarchies, where each classifier operates at a single operating point, thereby ensuring that all "yes" edges transport the same set of data (correspondingly all "no" edges transport the same set of data). With a classifier having multiple operating points, the "yes" and "no" edges can transport disjoint sets of data, with the total corresponding to the total input to the classifier.

Using multiple independent operating points per classifier for general multi-class, binary tree topologies has several benefits. Whenever resource constraints are severe, there may not exist a feasible joint configuration with a single operating point. For example, suppose the input rate of classifier $C_1$ in FIG. 3 is r. The classifier $C_1$ forwards each data object to exactly one of two classifiers C2 and C3, such that the two classifiers have a combined rate of (or complexity proportional to) r.

However, if not enough resources are allocated to the classifiers (i.e. their combined resources is less than r), buffers may overflow, leading to a fraction of data objects that must be arbitrarily shed from the system. This arbitrary shedding of load causes the operation of the individual classifier to lie below the DET curve, instead of lying on it. As a result, the end-to-end utility is reduced.

The use of multiple independent operating points per classifier allows a current classifier to transmit different fractions of data on different edges to account intelligently for both the data characteristics as well as the resource constraints. When resources are abundant, it can be beneficial to replicate some of the data across multiple edges, depending on the cost. For example, when the cost of false alarms are small, but cost of misses are high, replication can reduce the number of misses at the low price of increasing the number of false alarms. Replication means that the data across the "yes" and "no" edges is no longer disjoint.

The set of optimal operating points is then selected to send different amounts of data along each edge, such that the cost can be minimized while meeting any resource constraints. The set of optimal operating points can be set for each classifier by minimizing the end-to-end cost of errors (combination of false alarm and missed detection) under the given resource constraints. Using the cost defined in equation (3), this cost minimization problem may be formulated as the following equation 4:

$$\min_{P_F} c(P_F) = \min_{P_F} \sum_{k=1}^{K} c_M^k \cdot (\pi^k - g^k) + c_F^k(t^k - g^k), \quad (4)$$

$$\text{s.t. } Ah(P_F) \le R \text{ and } 0 \le P_F \le 1$$

where $P_F$ indicates the vector of false alarm configurations for all output edges of all classifiers and $h(P_F)=(h_1(P_F), \ldots, h_I(P_F))$ are the resources consumed by each classifier given the joint configuration $P_F$. The resource consumption can be modeled as a linear function of the input rate, which is determined by the configurations of upstream classifiers. A is an M×I binary placement matrix that maps each classifier onto M different processing nodes and R are the individual resource constraints. $A_{mi}=1$ if the classifier $C_i$ is placed on node m, and 0 otherwise. It is assumed that placement has been previously determined. The proposed cost minimization problem can be solved using a nonlinear programming technique called sequential quadratic programming (SQP).

Figure 5:
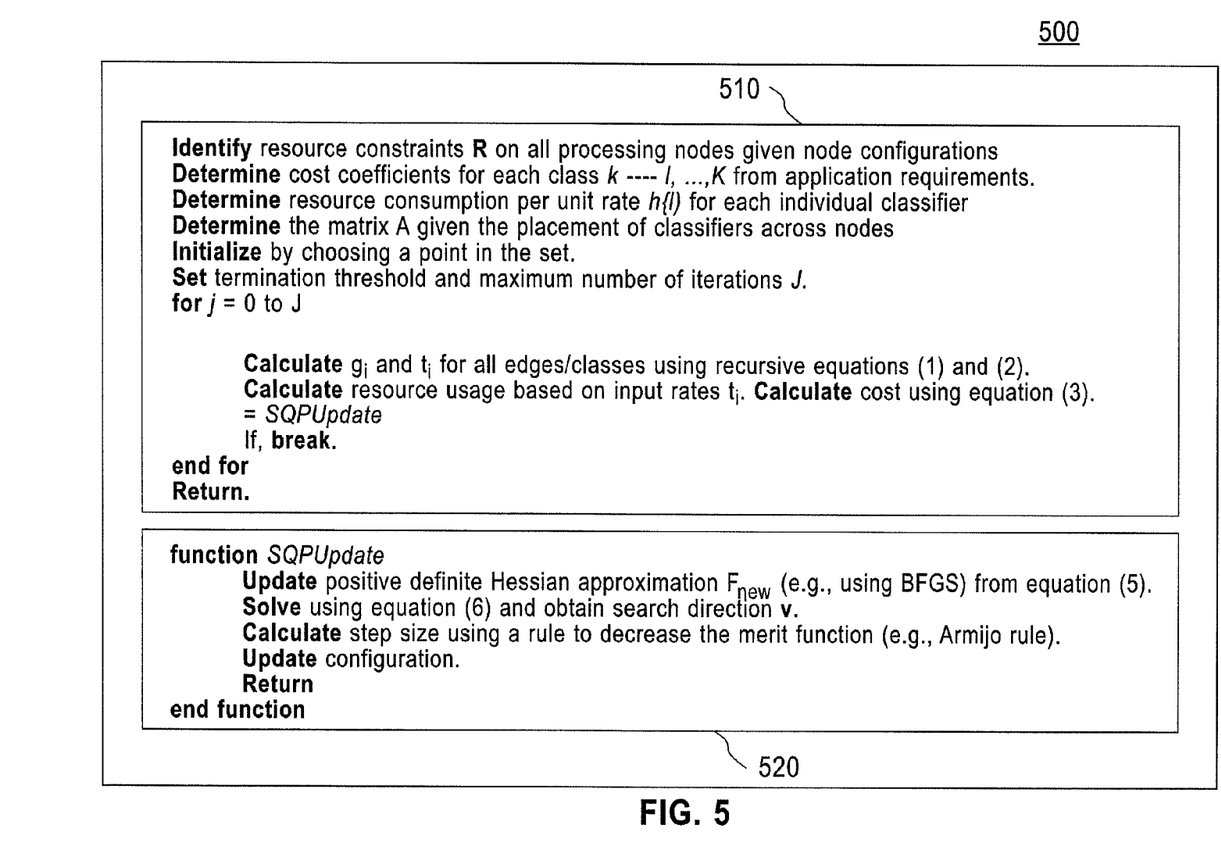
FIG. 5 illustrates exemplary pseudo code for selecting operating points according to an exemplary embodiment of the present invention.

The SQP is an iterative optimization technique that models the nonlinear optimization problem as an approximate quadratic programming sub-problem at each iteration. The SQP requires calculating the Lagrangian of the primal problem. The Lagrangian $L(P_F,\lambda,\xi,\nu)$ is given by the following equation 5:

$$L(P_F, \lambda, \xi, \nu) = \sum_{k=1}^{K} c(P_F) + \lambda^T (Ah(P_F) - R) + \xi^T(P_F - 1) - \nu^T P_F. \quad (5)$$

where $\lambda \in \square_+^M, \xi, \nu \in \square_+^I$ corresponds to the inequalities $Ah(P_F) \le R$, $P_F \le 1$, and $P_F \ge 0$ respectively. At each iteration j, the SQP approximates the Lagrangian function by a quadratic function, and linearizes the constraints by using the following equation 6:

$$\min_{\nu} \nabla \left( \sum_{k=1}^{K} c_k(P_F^{k(j)}) \right)^T \nu + \frac{1}{2} \nu^T \Gamma^{(j)} \nu \quad (6)$$

$$\text{s.t. } \nabla Ah(P_F^{(j)}) - R)^T \nu + Ah(P_F^{(j)}) \le R,$$

$$P_F^{(j)} + \nu \le 1, \text{ and } P_F^{(j)} + \nu \ge 0,$$

where v is the search direction given the current configuration approximation $P_F^{(j)}$. The matrix $\Gamma^{(j)}$ is a positive definite approximation of the Hessian matrix of the Lagrangian function and can be updated using any quasi-Newton method (e.g., a Broyden-Fletcher-Goldfarb-Shanno (BFGS) method). The j+1st approximation $P_F^{(j+1)}$ may be computed using the following equation 7:

$$P_F^{(j+1)} = P_F^{(j)} + \gamma^{(j)} \nu, \quad (7)$$

where the step length parameter $\gamma^{(j)}$ is determined by an appropriate line search procedure such that a sufficient decrease in the merit function is obtained. Exemplary pseudo code 500 that uses SQP to compute the set of optimal operating points is shown in FIG. 5. The pseudo code 500 includes a program 510 which calls a function 520.

Figure 6:
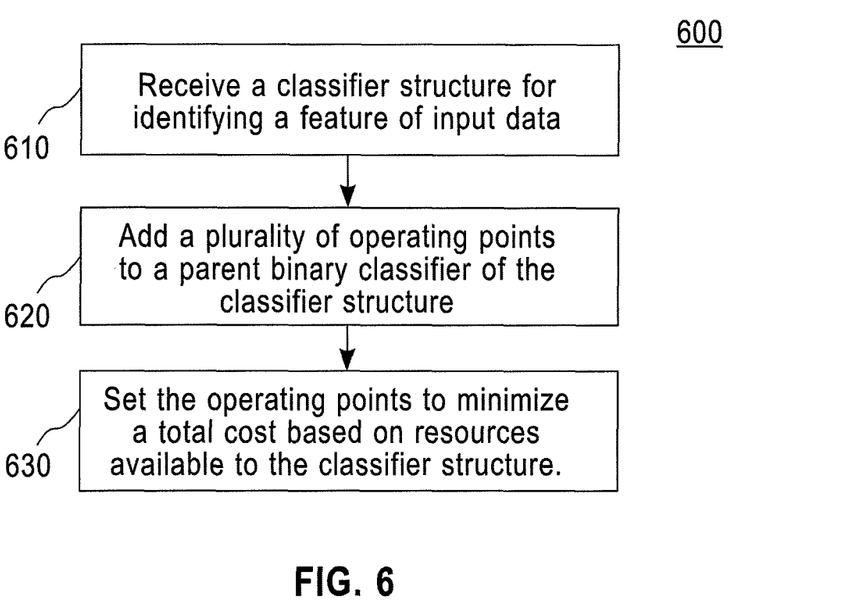
FIG. 6 illustrates a high-level flow chart of a method 600 for configuring a classifier structure according to an exemplary embodiment of the present invention.

FIG. 6 illustrates a high-level flow chart of a method 600 for configuring a classifier structure according to an exemplary embodiment of the present invention. Referring to FIG. 6, the method 600 includes the steps of receiving a classifier structure for a identifying a feature of input data (610), adding a plurality of operating points to a parent binary classifier of the classifier structure (620), and setting the operating points to minimize a total cost based on resources available to the classifier structure (630).

Figure 7:
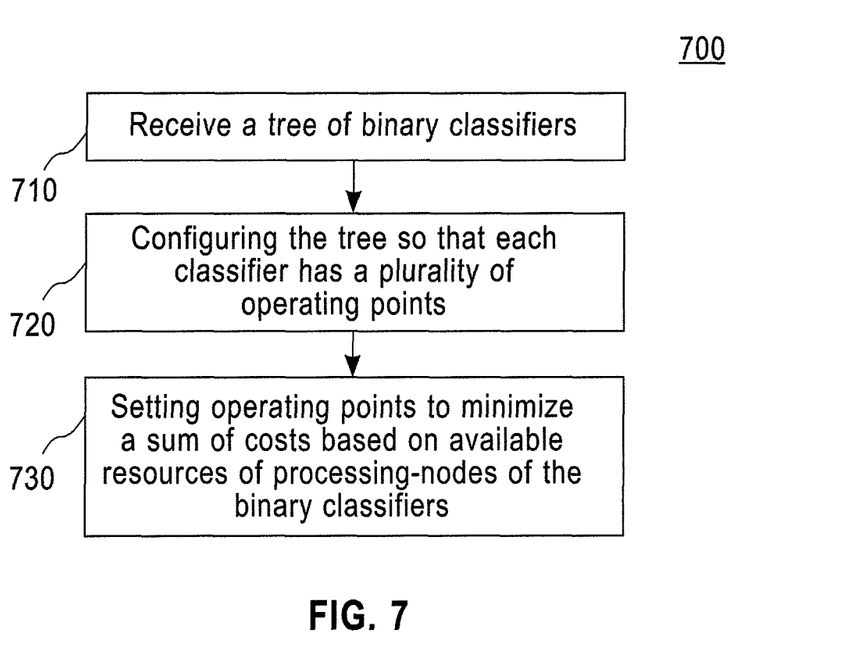
FIG. 7 illustrates a high-level flow chart of a method 700 for configuring a tree of binary classifiers according to an exemplary embodiment of the present invention.

FIG. 7 illustrates a high-level flow chart of a method 700 for configuring a tree of binary classifiers according to an exemplary embodiment of the present invention. Referring to FIG. 7, the method 700 includes the steps of receiving a tree of binary classifiers (710), configuring the tree so that each classifier has a plurality of operating points (720), and setting operating points to minimize a sum of costs based on available resources of processing nodes of the binary classifiers (730).

Figure 8:
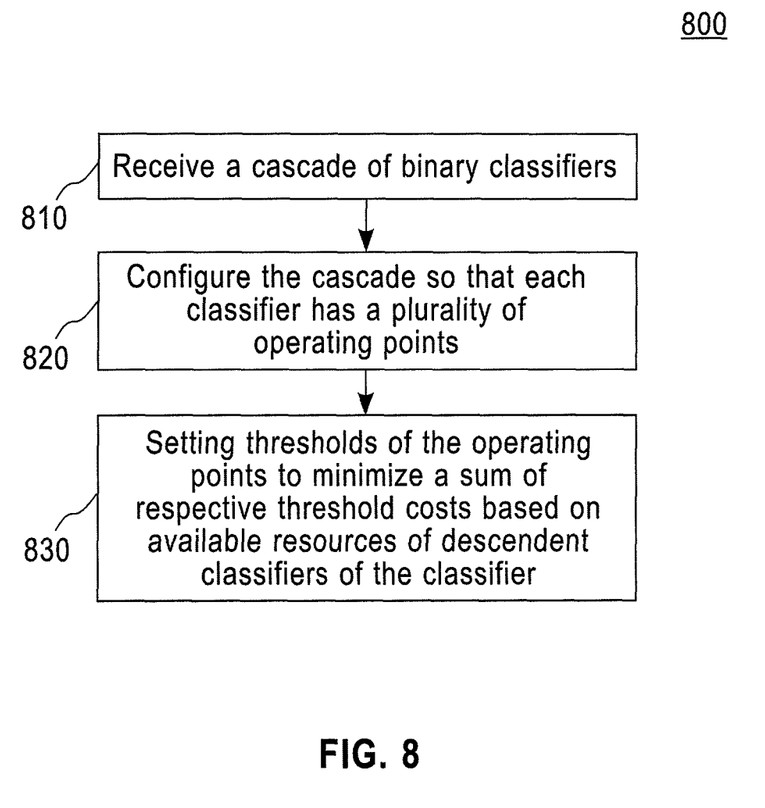
FIG. 8 illustrates a high-level flow chart of a method 800 for configuring a cascade of binary classifiers according to an exemplary embodiment of the present invention.

FIG. 8 illustrates a high-level flow chart of a method 800 for configuring a cascade of binary classifiers according to an exemplary embodiment of the present invention. The method 800 includes the steps of receiving a cascade of binary classifiers (810), configuring the cascade so that each classifier has a plurality of operating points (820), and setting thresholds of the operating points to minimize a sum of respective threshold costs based on available resources of descendent classifiers of the classifier (830).

Each of the classifier structures discussed above have been previously trained to identify one or more features in the input data. Each binary classifier can identify a plurality of data features. Each of the binary classifiers in a cascade are in sequence in the cascade.

The hierarchical organization of the above classifier structures enables the work of identification or classification to be broken up. For example, a parent binary classifier for speech could determine whether a speech sample is male or female speech and output the data classified as male to one or more child binary classifiers for male speech and the data classified as female to one or more child binary classifiers for female speech for further processing.

The number of operating points of a parent binary classifier may correspond to the number of child binary classifiers. Each operating point controls how data is classified by the parent binary classifier for distribution to the child binary classifiers. As an example, the analysis performed by the parent binary classifier on input data for a particular feature can result in a score. The more likely it is that the input data has the particular feature, the higher the score. For example, assume an operating point of a parent binary classifier has a single threshold of 0.5. The parent binary classifier for speech could then send data it rates below a score of 0.5 to a first set of the child binary classifiers and data it rates above 0.5 to a second set of the child binary classifiers. Next, assume that the classifier uses two operating points with corresponding thresholds, e.g., a first of 0.5 and a second of 0.7. The parent binary classifier for speech could then send data it rates below a score of 0.5 to a first set of the child binary classifiers, and data above 0.7 to a second set of child binary classifiers. Data that lies in the range between 0.5 and 0.7 may be discarded.

Each of the operating points has a respective cost. For example, assume that a parent binary classifier for speech classifies data it rates above a threshold of 0.9 as male speech. Such a high threshold may result in a higher probability of missed detections. Next assume that the parent binary classifier for speech classifies data rated above a 0.1 as male speech. Such a low threshold, may result in a higher probability of false detections. Each of the missed classifications has an associated cost (e.g., a cost of missed detections and a cost of false detections). Adjusting each of the thresholds or operating points has a corresponding effect on these costs.

The valid values for these operating points are limited by the resources of the child binary classifiers. Assume again that the threshold for the parent binary classifier is 0.9. Since it is difficult to satisfy such a high threshold, more of the data is likely to end up at the child binary classifiers for female speech. However, the child binary classifiers for female speech may have different resources than the child binary classifiers for male speech, since they can be executed on different processing nodes.

While it may be desirable to choose operating points that minimize the cost of missed detections and false detections, the selection of the operating points is still limited by the resources available to the child binary classifiers. The proposed cost minimization problem can be solved using a non-linear programming technique called sequential quadratic programming (SQP).

For example, assume a set of two operating points with corresponding two thresholds. Data rated by the classifier as falling below the first threshold can be sent across a first outgoing branch of the classifier and data rated by the classifier falling above the second threshold can be sent across a second outgoing branch of the classifier for further processing by one or more down stream classifiers.

Data that is rated by a classifier as falling between the two thresholds can be shed by the classifier. Data may also be shed by examining the resources of the processing nodes of the downstream classifiers. For example, assume the classifier has classified data for distribution to a downstream classifier which has resources below a predetermined threshold. Due to the lack of resources, the classifier can decide to shed part of the data before that distribution.

Figure 9:
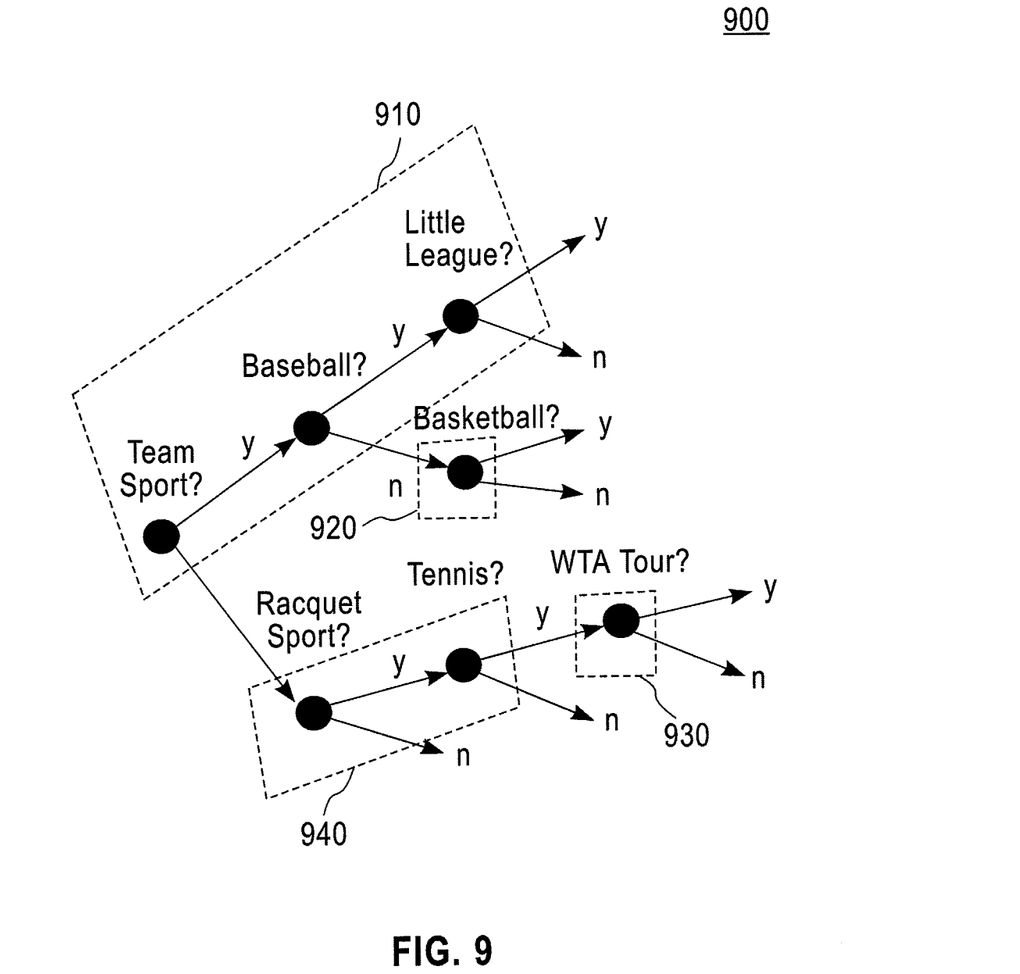
FIG. 9 illustrates a classifier graph according to an exemplary embodiment of the present invention.

FIG. 9 illustrates a classifier graph 900 according to an exemplary embodiment of the present invention. An embodiment of the present invention can, for example, be applied to an application requiring the hierarchical classification of sports images into multiple categories. The topology of the classifier graph with the underlying categories is shown in FIG. 9. Each individual sports classifier uses a Support Vector Machine (SVM) that may be trained independently on a large data set (e.g., 20,000 images). Different classifiers require a different amount of complexity to process each image, which is shown below in Table 1 in terms of the time taken and multiplied by a constant C to account for machines different from the one on which the numbers may be computed.

TABLE 1

| Task | Complexity to perform task | Total available resources on node |
| --- | --- | --- |
| Team Sports | 0.3884xC cycles/image | Node 1, 0.4300xC cycles/sec. |
| Baseball | 0.1761xC cycles/image | Node 1, 0.4300xC cycles/sec. |
| Racquet Sports | 0.1276xC cycles/image | Node 2, 0.1000xC cycles/sec. |
| Little League | 0.1307xC cycles/image | Node 1, 0.4300xC cycles/sec. |
| Basketball | 0.0772xC cycles/image | Node 3, 0.1000xC cycles/sec. |
| Tennis | 0.1720xC cycles/image | Node 2, 0.1000xC cycles/sec. |
| WTA Tour | 0.0125xC cycles/image | Node 4, 0.1000xC cycles/sec. |

This classifier topology may be instantiated on a set of 4 resource constrained processing nodes, with dotted lines corresponding encapsulating classifiers 910, 920, 930 and 940, placed on the same node. The placement and the resources available at each node are also listed in Table 1 in terms of cycles/second). The application may require an input image rate of 1 image per second and have and equal cost of false alarm and misses for each image in each class. The classifiers are tuned with multiple operating points using the SQP described above. As compared to classifiers having a single operating point, the resulting end-to-end costs incurred by the classifiers having multiple operating points are significantly lower.

It is to be understood that the particular exemplary embodiments disclosed above are illustrative only, as the invention may be modified and practiced in different but equivalent manners apparent to those skilled in the art having the benefit of the teachings herein. Furthermore, no limitations are intended to the herein described exemplary embodiments, other than as described in the claims below. It is therefore evident that the particular exemplary embodiments disclosed herein may be altered or modified and all such variations are considered within the scope and spirit of the invention. Accordingly, the protection sought herein is as set forth in the claims below.

What is claimed is:

1. A computer-implemented method for configuring a classifier structure, the method comprising:
    receiving, by a processor, a classifier structure for identifying one or more features of input data, the structure having a parent classifier trained as a binary classifier and a plurality of child binary classifiers, wherein the parent classifier is configured to identify one feature of interest by determining a numeric score representing a measure of a likelihood of the input data including the feature of interest;
    adding a plurality of thresholds to the parent classifier to generate a modified classifier, wherein each threshold is associated with a different child binary classifier and the plurality of thresholds control how data is distributed by the parent modified classifier to the child binary classifiers, wherein each threshold has a respective cost; and
    setting the plurality of thresholds to values different from one another to minimize the total cost based on the resources available to the child binary classifiers,
    wherein the modified classifier is configured to output data to each child binary classifier by comparing the determined score against the threshold associated with the corresponding child classifier,
    wherein the modified classifier includes at least two output branches for either outputting data excluding the feature or data including the feature to two child binary classifiers in parallel.

2. The computer-implemented method of claim 1, wherein the costs include a cost of the parent modified classifier missing detection of the feature and a cost of the parent modified classifier falsely detecting the feature.

3. The computer-implemented method of claim 1, further comprising assigning the child binary classifiers to a plurality of processing nodes, each of the processing nodes providing a part of the resources.

4. The computer-implemented method of claim 1, wherein the setting of the plurality of thresholds is performed using sequential quadratic programming.

5. The computer-implemented method of claim 1, wherein the data excluding the feature is transmitted from the modified classifier to a child binary classifier if the score is less than the threshold associated with the child binary classifier.

6. The computer-implemented method of claim 1, wherein the data including the feature is transmitted to a child classifier if the score is greater than the threshold associated with the child classifier.

7. The computer-implemented method of claim 1, wherein data that fails all such threshold comparisons is discarded by the modified classifier.

8. A computer program product for configuring a classifier structure, the computer program product comprising a computer readable storage medium not including propagated signals having program code embodied therewith, the program code executable by a processor to:
    receive a classifier structure for identifying one or more features of input data, the structure having a parent classifier trained as a binary classifier and a plurality of child binary classifiers, wherein the parent classifier is configured to identify one feature of interest by determining a numeric score representing a measure of a likelihood of the input data including the feature of interest;
    add a plurality of thresholds to the parent classifier to generate a modified classifier, wherein each threshold is associated with a different child binary classifier and the plurality of thresholds control how data is distributed by the parent modified classifier to the child binary classifiers, wherein each threshold has a respective cost; and
    set the plurality of thresholds to values different from one another to minimize the total cost based on the resources available to the child binary classifiers,
    wherein the modified classifier is configured to output data to each child binary classifier by comparing the determined score against the threshold associated with the corresponding child classifier,
    wherein the modified classifier includes at least two output branches for either outputting data excluding the feature or data including the feature to two child binary classifiers in parallel.

9. The computer program product of claim 8, wherein the costs include a cost of the parent modified classifier missing detection of the feature and a cost of the parent modified classifier falsely detecting the feature.

10. The computer program product of claim 8, wherein the program code assigns the child binary classifiers to a plurality of processing nodes, each of the processing nodes providing a part of the resources.

11. The computer program product of claim 8, wherein the program code sets the plurality of thresholds using sequential quadratic programming.

12. The computer program product of claim 8, wherein the data excluding the feature is transmitted from the modified classifier to a child binary classifier if the score is less than the threshold associated with the child binary classifier.

13. The computer program product of claim 8, wherein the data including the feature is transmitted to a child classifier if the score is greater than the threshold associated with the child classifier.

14. The computer program product of claim 8, wherein data that fails all such threshold comparisons is discarded by the modified classifier.

15. A computer-implemented method for configuring a classifier structure, the method comprising:
    receiving, by a processor, a classifier structure for identifying one or more features of input data, the structure having a parent classifier trained as a binary classifier and a plurality of child classifiers, wherein the parent classifier is configured to identify one feature of interest by determining a numeric score representing a measure of a likelihood of the input data including the feature of interest, and wherein the parent classifier has a first threshold;

adding a second threshold to the parent classifier to generate a modified classifier, wherein each threshold is associated with a different child classifier and the two thresholds control how data is distributed by the parent modified classifier to the child classifiers, wherein each threshold has a respective cost; and setting the two thresholds to values different from one another to minimize the total cost based on the resources available to the child binary classifiers, wherein the modified classifier is configured to output data to each child classifier by comparing the determined score against the threshold associated with the corresponding child classifier, and wherein the data including the feature is transmitted to a child classifier if the score is greater than the threshold associated with the child classifier.

16. The computer-implemented method of claim 15, wherein the data excluding the feature is transmitted from the modified classifier to a child classifier if the score is less than the threshold associated with the child binary classifier.

17. The computer-implemented method of claim 15, wherein data that fails all such threshold comparisons is discarded by the modified classifier.

* * * * *